United States Patent
Tagami

(10) Patent No.: US 8,997,631 B2
(45) Date of Patent: *Apr. 7, 2015

(54) WOBBLE PLATE-TYPE VARIABLE DISPLACEMENT COMPRESSOR

(75) Inventor: Shinji Tagami, Sawa-gun (JP)

(73) Assignee: Sanden Corporation, Gunma (JP)

( * ) Notice: Subject to any disclaimer, the term of this patent is extended or adjusted under 35 U.S.C. 154(b) by 1142 days.

This patent is subject to a terminal disclaimer.

(21) Appl. No.: 12/996,013

(22) PCT Filed: May 13, 2009

(86) PCT No.: PCT/JP2009/058905
§ 371 (c)(1),
(2), (4) Date: Dec. 2, 2010

(87) PCT Pub. No.: WO2009/147934
PCT Pub. Date: Dec. 10, 2009

(65) Prior Publication Data
US 2011/0088547 A1    Apr. 21, 2011

(30) Foreign Application Priority Data

Jun. 2, 2008    (JP) .................................. 2008-144527

(51) Int. Cl.
*F01B 13/04*    (2006.01)
*F04B 27/08*    (2006.01)
*F04B 27/10*    (2006.01)
(Continued)

(52) U.S. Cl.
CPC ......... *F04B 27/0895* (2013.01); *F04B 27/1063* (2013.01); *F04B 27/1072* (2013.01); *F16D 3/24* (2013.01); *F16H 23/08* (2013.01)

(58) Field of Classification Search
USPC ........................................................ 92/12.2
See application file for complete search history.

(56) References Cited

U.S. PATENT DOCUMENTS

| 2,947,182 A |   | 8/1960 | Wahlmark |
|---|---|---|---|
| 5,055,004 A | * | 10/1991 | Ebbing et al. .................. 92/12.2 |
| 5,112,197 A |   | 5/1992 | Swain et al. |
| 5,129,752 A |   | 7/1992 | Ebbing et al. |
| 5,231,914 A | * | 8/1993 | Hayase et al. ................. 92/12.2 |

(Continued)

FOREIGN PATENT DOCUMENTS

| DE | 2331033 | 1/1975 |
|---|---|---|
| GB | 505535 | 5/1939 |

(Continued)

*Primary Examiner* — F. Daniel Lopez
(74) *Attorney, Agent, or Firm* — Cozen O'Connor

(57) ABSTRACT

Disclosed is a wobble plate type variable displacement compressor that uses a constant velocity universal joint mechanism, which comprises an inner ring and an outer ring, balls that are held between guide grooves of the inner ring and the outer ring to transmit power, wherein a wobble plate is connected and fixed to the outer ring. In the compressor, the wobble plate is provided with a cylindrical part which extends in the axial direction of a swash plate, and in the relative rotation structure between the swash plate, and the wobble plate and the outer ring, the swash plate is supported to be able to relatively rotate only in relation to the wobble plate via a bearing interposed at least between the cylindrical part and the inner diameter portion of the swash plate, without being supported to be able to rotate relative to the outer ring. With this wobble plate type variable displacement compressor using the specified constant velocity universal joint mechanism, the relative rotation structure between the wobble plate and the outer ring, and the swash plate, can be improved, workability and productivity can be improved, and the cost and weight can be reduced.

7 Claims, 6 Drawing Sheets

(51) Int. Cl.
*F16D 3/24* (2006.01)
*F16H 23/08* (2006.01)

(56) References Cited

U.S. PATENT DOCUMENTS

| | | | |
|---|---|---|---|
| 5,509,346 A | | 4/1996 | Kumpf |
| 8,327,751 B2 * | 12/2012 | Tagami | .......................... 92/12.2 |
| 8,549,985 B2 * | 10/2013 | Tagami | .............................. 92/71 |

FOREIGN PATENT DOCUMENTS

| | | |
|---|---|---|
| GB | 1 480 384 | 7/1977 |
| JP | 5-099137 | 4/1993 |
| JP | 5-202849 | 8/1993 |
| JP | 2005-264919 | 9/2005 |
| JP | 2006-200405 | 8/2006 |
| JP | 2008-138637 | 6/2008 |
| JP | 2009-162064 | 7/2009 |

* cited by examiner

WOBBLE PLATE-TYPE VARIABLE DISPLACEMENT COMPRESSOR

RELATED APPLICATIONS

This is a U.S. National Phase Application under 35 USC §371 of International Application PCT/JP2009/058905 filed on May 13, 2009.

This application claims the priority of Japanese Patent Application No. 2008-144527 filed Jun. 2, 2008, the entire content of which is hereby incorporated by reference.

TECHNICAL FIELD OF THE INVENTION

The present invention relates to a wobble plate type variable displacement compressor, and specifically, to a wobble plate type variable displacement compressor which incorporates therein a new rotation preventing mechanism for the wobble plate.

BACKGROUND ART OF THE INVENTION

A wobble plate type variable displacement compressor is known wherein a rotational movement of a swash plate rotated together with a rotational main shaft and supported changeably in angle relative to the main shaft is converted into a wobble movement of a wobble plate, and by transmitting the wobble movement to a piston connected to the wobble plate, the piston is reciprocated. In such a wobble plate type variable displacement compressor, because it is necessary to prevent the rotation of the wobble plate connected to the piston, a rotation preventing mechanism of the wobble plate is incorporated. With respect to the rotation preventing mechanism of the wobble plate, various improvements for making the compressor small, improving the durability and the silent performance, facilitating processing, cost down, etc., have been investigated.

For example, in Patent documents 1, 3 and 4, a structure provided with a Birfield type constant velocity universal joint as a wobble plate rotation preventing mechanism is disclosed. In this structure, since wobble parts and a swash plate are supported by an outer ring of a Birfield type constant velocity universal joint provided as a wobble plate rotation preventing mechanism, and ultimately supported by a main shaft via a cage of an internal part of the constant velocity universal joint (a cage for regulating positions of a plurality of balls for performing power transmission), and further, via an inner ring of the constant velocity universal joint, the number of interposed parts increases and the accumulated play becomes great, and therefore, there is a problem insufficient in vibration, noise and durability.

Further, although the Birfield type constant velocity universal joint disclosed in Patent documents 1, 3 and 4 theoretically has a structure performing a rotational power transmission between inner and outer rings by a plurality of balls, actually it is difficult to achieve uniform and continuous contact of the plurality of balls, and therefore, a contact pressure of specified balls may locally increase. Further, because the rotational power transmission between inner and outer rings is performed in the shear direction of balls by ball guide grooves formed on each of inner and outer rings on both sides of a cage, the contact surface between the balls and the guide grooves may have a large inclination relative to the power transmission direction. By this, when a predetermined power is transmitted, the contact load generated as a vertical reaction force becomes high. Therefore, in order to ensure a sufficient transmission ability, it is necessary to employ a sufficiently large ball size (ball diameter), and from these reasons, it is difficult to make the structure further small-sized, and it is difficult to apply it to a small displacement compressor.

Further, since the support for the rotational main shaft of the compressor in the internal mechanism described in Patent documents 2, 3 and 4 is provided on one side relative to the main mechanism portion (a cantilever supporting is employed), whirling of the main shaft becomes great, and it is disadvantageous on durability, vibration and noise.

Further, in the compression mechanism disclosed in Patent documents 3 and 4, since the inner ring of the constant velocity universal joint is supported slidably in the axial direction at a condition being prevented with rotation, it is necessary to make the main shaft thick in order to ensure the rigidity of the main shaft provided to the housing to be sufficiently great, and it may cause increase of the weight of the main shaft and the weight of the product.

Further, in the constant velocity universal joint mechanism disclosed in Patent documents 3 and 4, machining of grooves for regulating the positions of a plurality of balls operating for power transmission is complicated, and the mechanism may be disadvantageous on cost.

Furthermore, in the compression mechanism disclosed in Patent document 2, since there is no support in the radial direction due to the main shaft in the main mechanism portion and play in the wobble portion in the radial direction tends to become great, by this play, problems on durability, vibration and noise may occur.

PRIOR ART DOCUMENTS

Patent Documents

Patent document 1: U.S. Pat. No. 5,112,197
Patent document 2: U.S. Pat. No. 5,509,346
Patent document 3: U.S. Pat. No. 5,129,752
Patent document 4: JP-A-2006-200405

SUMMARY OF THE INVENTION

Problems to be Solved by the Invention

Paying attention to the problems in the above-described conventional technologies, a wobble plate type variable displacement compressor is previously proposed by the applicant of the present invention which uses a constant velocity universal joint small-sized, good in durability and silent performance, easy-to-machine and inexpensive, that has achieved to realize uniform and continuous contact of a plurality of balls operating for power transmission while suppressing play in the radial direction and rotational direction of the inside of the constant velocity universal joint provided as a wobble plate rotation preventing mechanism (Japanese Patent Application No. 2006-327988).

In this proposal, as the rotation preventing mechanism of the wobble plate, a mechanism is provided, which comprises (a) an inner ring provided in a housing movably in an axial direction although rotation is prevented, supporting a rotational main shaft via a bearing at an inner diameter portion to rotate relatively and to move relatively in an axial direction and having a plurality of guide grooves for guiding a plurality of balls provided for power transmission, (b) a sleeve functioning as a wobble central member of the wobble movement of the wobble plate, provided on the rotational main shaft to rotate relatively thereto and to move in an axial direction and engaged with the inner ring movably in an axial direction together with the inner ring, (c) an outer ring having a plurality of guide grooves for guiding the balls at positions opposing respective guide grooves of the inner ring, supported on the sleeve wabblingly, supporting the wobble plate fixedly on an outer circumference and supporting the swash plate rotatably via a bearing, and (d) a plurality of balls held by the guide grooves formed in the inner ring and the outer ring at a condition of opposing each other and performing power transmission by being compressed between the guide grooves.

By this proposal, a wobble plate type variable displacement compressor made small-sized, good in durability and silent performance, easy-to-machine and inexpensive, has become possible, but, even in this proposed mechanism, matters to be further improved are still left. Namely, in the above-described previous proposal, the wobble plate and the outer ring in the wobble plate rotation preventing mechanism are formed as a wobble portion which can rotate relative to the swash plate and the rotation of which itself is prevented, and this relative rotation structure relative to the swash plate is formed via a bearing interposed between the wobble plate and the swash plate and a bearing interposed between the outer ring and the swash plate. More concretely, an annular portion forming an outer circumferential cylindrical surface of the outer ring of the rotation preventing mechanism is extended in the axial direction up to the inside of the swash plate, and the outer circumferential cylindrical surface is supported in the swash plate via a bearing so as to be able to rotate relative to the swash plate. However, although the annular portion of the outer ring of the rotation preventing mechanism must be made thin from restriction in outer diameter dimension, it is difficult to make the part of the thin and long annular portion, and after the annular portion is made as a thick portion, it is made thin by machine processing, and therefore, the workability and productivity are not good and increase of cost is caused. Further, because an iron based material is used for the outer ring of the rotation preventing mechanism relative to the wobble plate made from an aluminum based material, increase of weight is caused accompanying with increase of the length in the axial direction.

Accordingly, paying attention to the problems left in the above-described new wobble plate rotation preventing mechanism using a specified constant velocity universal joint mechanism which was previously proposed by the applicant of the present invention, an object of the present invention is to provide a wobble plate type variable displacement compressor which can improve the relative rotation structure between the above-described wobble plate and the outer ring in the rotation preventing mechanism, and the swash plate, thereby improving the workability and productivity and reducing the cost and weight.

Means for Solving the Problems

To achieve the above-described objects, a wobble plate type variable displacement compressor according to the present invention has pistons inserted reciprocally into cylinder bores, a swash plate rotated together with a rotational main shaft and supported changeably in angle relative to the main shaft, a wobble plate which is connected to the pistons, in which a rotational movement of the swash plate is converted into a wobble movement of the wobble plate, and which transmits the wobble movement to the pistons to reciprocate the pistons, and a rotation preventing mechanism of the wobble plate, and is characterized in that the rotation preventing mechanism of the wobble plate comprises (a) an inner ring provided in a housing movably in an axial direction while being prevented with rotation and having a plurality of guide grooves for guiding a plurality of balls provided for power transmission, (b) an outer ring having a plurality of guide grooves for guiding the balls at positions opposing respective guide grooves of the inner ring, and connected with the wobble plate on an outer circumference of the outer ring and supported wobblingly together with the wobble plate, and (c) a plurality of balls held by the guide grooves formed in the inner ring and the outer ring at a condition of opposing each other and performing power transmission by being compressed between the guide grooves, and the wobble plate connected to the outer ring is provided with a cylindrical part which extends in an axial direction of the swash plate, and in a relative rotation structure between the swash plate, and the wobble plate and the outer ring, the swash plate is supported to be able to relatively rotate only in relation to the wobble plate via a bearing interposed at least between the cylindrical part and an inner diameter portion of the swash plate, without being supported to be able to rotate relative to the outer ring. Where, the inner ring can support the rotational main shaft at its inner diameter portion, so that the main shaft can rotate relatively and can move relatively in the axial direction.

In the rotation preventing mechanism of the wobble plate thus constructed, first, the outer ring of the rotation preventing mechanism is supported wobblingly together with the wobble plate, and the wobble plate rotation preventing mechanism is formed via the guide grooves opposing each other, formed on the inner and outer rings, and the balls held between the guide grooves. Then, the inner ring is supported in the housing movably in the axial direction and prevented with rotation, and by the inner diameter portion of this inner ring, for example, by the bearing provided in the inner diameter portion, the rotational main shaft, for example, the rear end portion of the rotational main shaft, is supported. Therefore, the rotational main shaft is rotatably supported at both sides of the compression main mechanism portion (that is, inboard type supporting), a sufficiently high rigidity can be easily ensured, the whirling of the main shaft may be suppressed small, and therefore, it becomes possible to make the diameter of the main shaft small, improve the reliability and reduce vibration and noise. Further, because the whirling of the main shaft is suppressed, the deflection of the swash plate rotated together with the main shaft may be suppressed small, and the rotational balance of the whole of the rotational portion may be improved. Further, by optimizing the formation of the guide grooves formed on the inner ring and the outer ring which oppose each other, uniform and continuous contact of the balls held between the guide grooves becomes possible, and therefore, it becomes possible to improve the reliability and reduce vibration and noise. Furthermore, the guide grooves of balls may be formed so that balls can roll between a pair of guide grooves separated from each other accompanying with the movement of the intersection of both guide grooves, complicated shapes are not required for the guide grooves themselves, and therefore, the machining therefor is facilitated and becomes advantageous on cost. In such a structure according to the present invention, basically, the plurality of balls operating for power transmission perform power transmission at a condition where they are nipped and supported between guide grooves facing to each other in the compression direction. By this, an actual contact area can be ensured sufficiently large, it becomes possible to reduce the contact surface pressure, and it becomes advantageous on reliability. Further, because the contact surface pressure can be reduced, it becomes possible to make the diameter of balls small and it becomes also possible to make the whole of the rotation preventing mechanism small-sized.

Then, with respect to the above-described wobble plate rotation preventing mechanism, the relative rotation structure between the swash plate, and the wobble plate and the outer ring, is improved as follows, as compared with the case of being formed by interposing bearings both of between the swash plate and the wobble plate and between the swash plate and the outer ring as in the previous proposal. Namely, a cylindrical part extending in the axial direction of the swash plate is provided to the wobble plate connected to the outer ring, and in the relative rotation structure between the swash plate, and the wobble plate and the outer ring, the swash plate is supported to be able to relatively rotate only in relation to the wobble plate via a bearing interposed at least between the above-described cylindrical part and an inner diameter portion of the swash plate, without being supported to be able to rotate relative to the outer ring. By this structure, the axial length of the outer circumferential annular portion of the outer ring, which has been extended up to the inner diameter portion of the swash plate, can be greatly shortened, and the problems of deterioration of workability and productivity and increase of cost, that have been caused for making the annular portion thin, can be solved. Further, since the whole of the outer ring can be made small, the weight of the outer ring made of an iron-based material can be greatly reduced. Instead, although a cylindrical part extending in the axial direction of the swash plate is to be provided to the wobble plate in order to achieve the relative rotation structure between the wobble plate and the swash plate, because the wobble plate can be formed from an aluminum-based material, by making the outer ring small-sized as described above, an advantage for reducing the weight relative to the whole of the wobble plate rotation preventing mechanism can be surely obtained. Where, because the wobble plate is formed as a larger-diameter member as compared with the outer ring, the difficulty in forming and the difficulty in machining for forming of the annular portion of the outer ring, that have been required to be made thin in the previous proposal, are not accompanied, and therefore, it is possible to manufacture a wobble plate having a desirable shape relatively easily.

In this wobble plate type variable displacement compressor, a structure may be employed wherein the inner ring in the above-described wobble plate rotation preventing mechanism slides directly on the rotational main shaft in the axial direction, and a structure may also be employed wherein the inner ring slides via a sleeve. In the latter case, a structure may be employed wherein the above-described wobble plate rotation preventing mechanism further comprises (d) a sleeve functioning as a wobble central member of the wobble movement of the wobble plate, provided on the rotational main shaft to rotate relatively thereto and to move in the axial direction and engaged with the inner ring movably in the axial direction together with the inner ring, and the above-described outer ring is supported wobblingly on the sleeve.

In such a wobble plate type variable displacement compressor according to the present invention, a structure may be employed wherein the guide grooves opposing each other of the inner ring and the outer ring of the above-described wobble plate rotation preventing mechanism are formed at a relative angle of 30 to 60 degrees relative to a center axis of the rotational main shaft, and guide grooves opposing each other for forming a single ball guide are disposed so as to be symmetric relative to a plane perpendicular to the main shaft and passing through a wobble center of the wobble plate at a condition where a relative angle between an axis of the inner ring and an axis of the outer ring is zero. By the structure where the guide grooves opposing each other are disposed at a crossed axes angle within a predetermined range and both guide grooves formed in the directions crossed with each other are disposed symmetrically relative to the plane passing through the wobble center of the wobble plate, it becomes possible that the balls held between the guide grooves are brought into contact with both guide grooves at a uniform and continuous condition, the vibration and noise at this portion may be greatly reduced, and the reliability may be greatly improved.

Further, in this constitution, a structure may be employed wherein two ball guides adjacent to each other among a plurality of ball guides of the above-described rotation preventing mechanism are referred to be a pair of ball guides, and the pair of ball guides are disposed in parallel to each other. By such a structure, because the play in the rotational direction in the rotation preventing mechanism portion is schematically decided by a relationship between the distance between the bottoms of the pair of guide grooves provided, on the inner and outer rings and the diameter of the balls, setting and management of an actual clearance between the bottoms of the guide grooves and the balls are facilitated, and it becomes possible to suppress the play to be small by setting a proper clearance.

In this constitution, a structure may be employed wherein the pair of ball guides disposed in parallel to each other are disposed symmetrically relative to a plane including a center axis of the rotational main shaft, and a structure also may be employed wherein a guide groove forming one ball guide of the pair of ball guides, which are disposed in parallel to each other, is disposed so that its axis is positioned on a plane including a center axis of the rotational main shaft. In the former structure, a rotation preventing mechanism, in which a rotational direction may not be selected, can be formed, and it becomes possible to reduce the contact load of the balls, and in the latter structure, it becomes possible to further reduce the contact load by setting the power transmission direction at a specified direction.

Further, in the above-described wobble plate rotation preventing mechanism, a structure may be employed wherein two ball guides disposed on both sides of the rotational main shaft approximately symmetrically relative to the rotational main shaft among the plurality of ball guides are referred to be a pair of ball guides, and the pair of ball guides are disposed in parallel to each other. By this structure, because the play in the rotational direction in the rotation preventing mechanism portion is schematically decided by a relationship between the distance between the bottoms of the pair of guide grooves provided on the inner and outer rings and the diameter of the balls, it becomes possible to set and manage actual clearances in both ball guides simultaneously at desirable clearances, by disposing two ball guides symmetrically disposed in parallel to each other. As a result, the setting and management of the clearances are facilitated, and it becomes possible to suppress the play to be small.

In this structure, it is preferred that the above-described pair of ball guides, which are disposed in parallel to each other, are disposed so that axes of guide grooves forming the pair of ball guides are positioned on a plane including a center axis of the rotational main shaft. By disposing the pair of ball guides on the plane including the center axis of the rotational main shaft, it becomes possible to minimize the ball contact load without selecting the power transmission direction.

Effect According to the Invention

Thus, in the wobble plate type variable displacement compressor according to the present invention, as compared with the wobble plate rotation preventing mechanism using the conventional constant velocity universal joint, uniform and continuous contact of a plurality of balls operating for power transmission can be achieved while the play can be suppressed small, a rotation preventing mechanism small-sized, excellent in durability and silent performance, good in rotational balance, easy in machining and inexpensive can be realized, and a wobble plate type variable displacement compressor, having an excellent performance which has not been achieved by the conventional technologies, can be provided. And, in the wobble plate rotation preventing mechanism of this compressor, since a structure is employed wherein a cylindrical part extending in the axial direction of the swash plate is provided to the wobble plate, and the swash plate is supported to be able to relatively rotate only in relation to the wobble plate without being supported to be able to rotate relative to the outer ring, the problems of deterioration of workability and productivity of the outer ring and increase of cost in the previous proposal can be solved, and the weight of the entire mechanism can be reduced by forming the whole of the outer ring small. Therefore, improvement of workability and productivity and reduction of cost and weight, that are objects in the present invention, can be surely achieved.

EMBODIMENTS FOR CARRYING OUT THE INVENTION

Hereinafter, embodiments of the present invention will be explained referring to figures.

First, in order to understand a new wobble plate rotation preventing mechanism in a wobble plate type variable displacement compressor according to the present invention, an embodiment of the basic structure of the whole of this wobble plate type variable displacement compressor will be explained referring to FIGS. 1-5, and next, for the embodiment of this basic structure, with respect to a structure improved by the present invention, in particular, a structure wherein an outer ring is made small-sized and a swash plate is supported only by the wobble plate side so as to be able to relatively rotate, FIGS. 6-8 will be explained.

Figure 1:
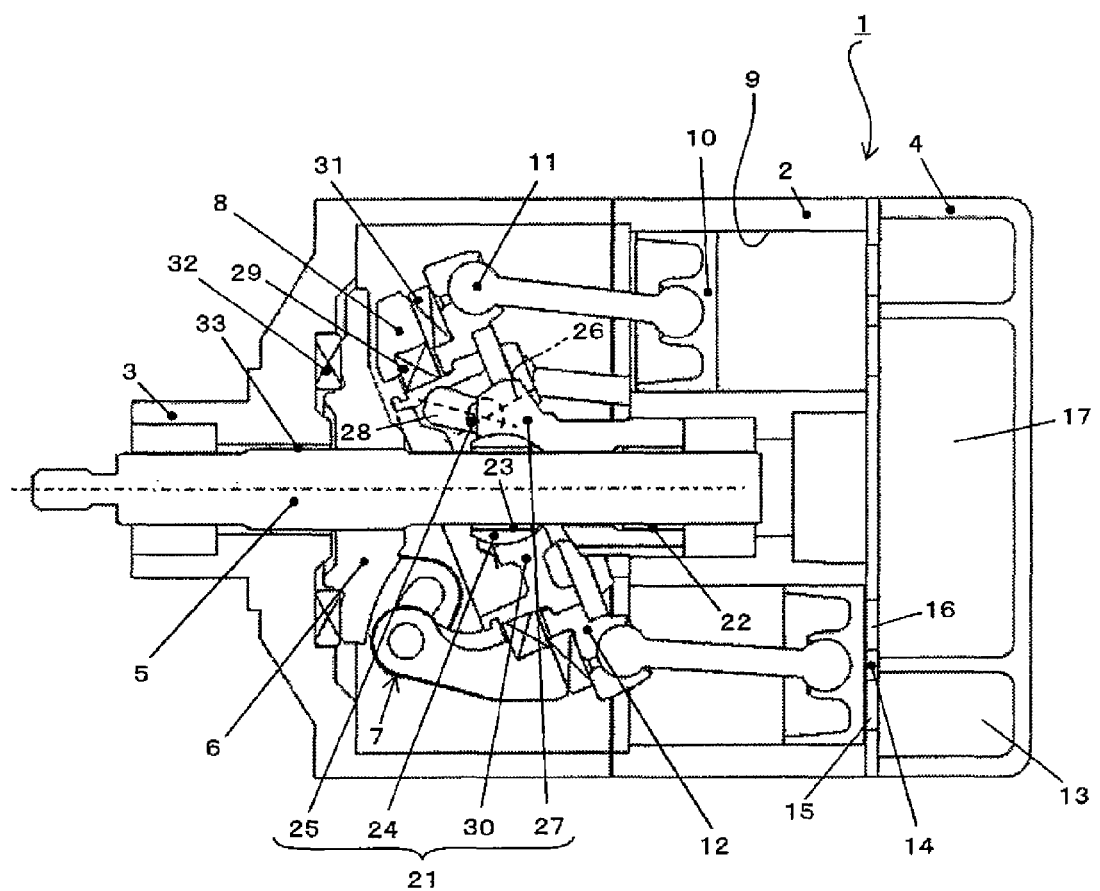
FIG. 1 is a vertical sectional view of a compressor showing an example of a basic structure of a wobble plate type variable displacement compressor having a wobble plate rotation preventing mechanism in the present invention.
Figure 2:
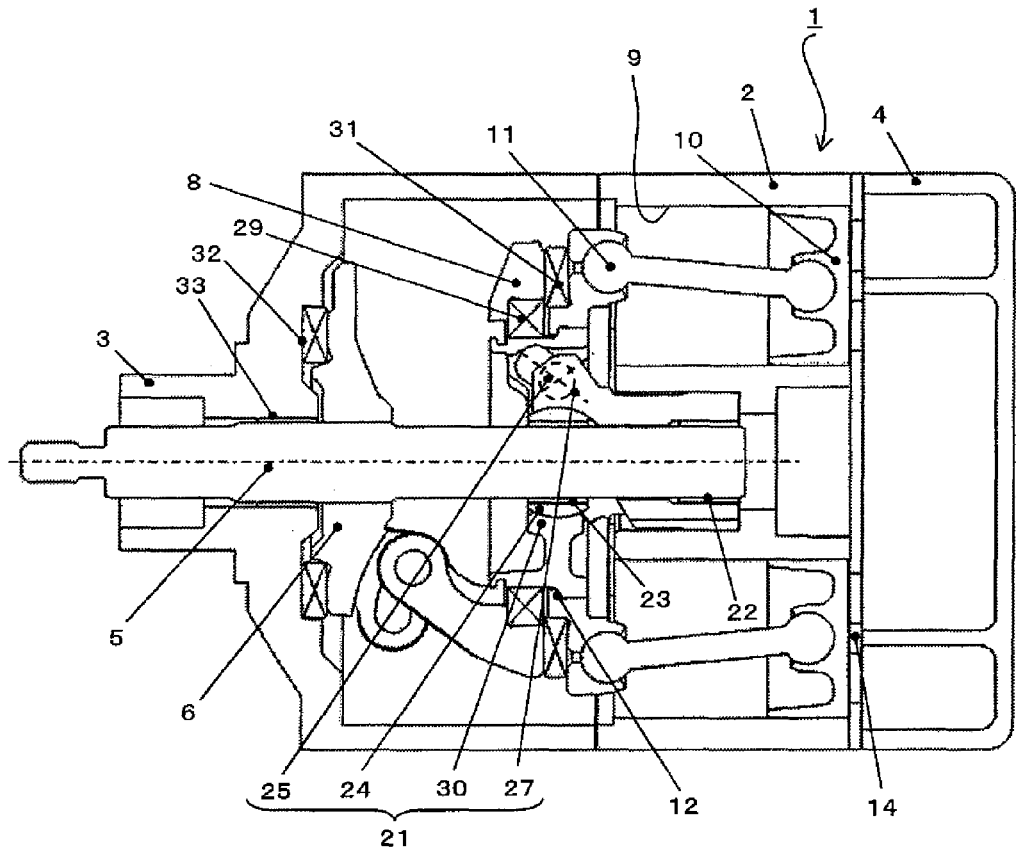
FIG. 2 is a vertical sectional view of the wobble plate type variable displacement compressor depicted in FIG. 1, showing an operational condition different from that depicted in FIG. 1.
Figure 3:
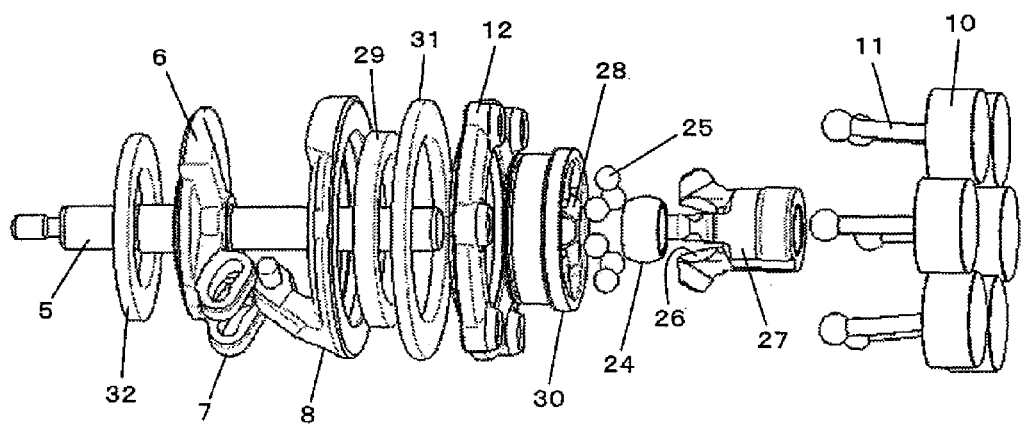
FIG. 3 is an exploded perspective view of a main portion including a wobble plate rotation preventing mechanism of the wobble plate type variable displacement compressor depicted in FIG. 1.

FIG. 1 shows an example of a basic structure of the whole of a wobble plate type variable displacement compressor having a wobble plate rotation preventing mechanism according to the present invention, and shows its entire structure in the operation state at the condition of the displacement achieving its maximum discharge. FIG. 2 shows the operation state of the wobble plate type variable displacement compressor depicted in FIG. 1 at the condition of the displacement achieving its minimum discharge. FIG. 3 shows a main portion including a wobble plate rotation preventing mechanism in the wobble plate type variable displacement compressor according to the embodiment of the basic structure depicted in FIG. 1, as an exploded perspective view.

In FIGS. 1 and 2, a wobble plate type variable displacement compressor 1 has a housing 2 disposed at the central portion, a front housing 3 and a rear housing 4 disposed on both sides of the housing 1 as its housings, and a rotational main shaft 5 inputted with a rotational drive power from outside is provided over the range from the portion of housing 2 up to the position extending through front housing 3. A rotor 6 is fixed to rotational main shaft 5 so as to be rotated integrally with main shaft 5, and a swash plate 8 is connected to rotor 6 via a hinge mechanism 7, changeably in angle and rotatably together with rotational main shaft 5. Piston 10 is reciprocally inserted into each cylinder bore 9, and piston 10 is connected to wobble plate 12 via connecting rod 11. The rotational movement of swash plate 8 is converted into the wobble movement of wobble plate 12, the wobble movement is transmitted to piston 10 via connecting rod 11, and piston 10 is reciprocated. Fluid to be compressed (for example, refrigerant) is sucked from suction chamber 13 formed in rear housing 4 into cylinder bore 9 through suction hole 15 formed on valve plate 14 (a suction valve is omitted in the figure) accompanying with the reciprocating movement of piston 10, and after the sucked fluid is compressed, the compressed fluid is discharged into discharge chamber 17 through discharge hole 16 (a discharge valve is omitted in the figure), and therefrom, sent to an external circuit.

It is necessary that the above-described wobble plate 12 performs a wobble movement at a condition where its rotation is prevented. Hereinafter, the remaining portions of compressor 1 will be explained mainly with respect to the rotation preventing mechanism of this wobble plate 12, referring to FIGS. 1 to 3.

Rotation preventing mechanism 21 of wobble plate 12 is formed from a mechanism comprising (a) an inner ring 27 provided in housing 2 movably in the axial direction although its rotation is prevented, supporting rotational main shaft 5 via a bearing 22 (radial bearing) at its inner diameter portion to rotate relatively and to move relatively in the axial direction and having a plurality of guide grooves 26 for guiding a plurality of balls 25 provided for power transmission, (d) a sleeve 24 functioning as a wobble central member of the wobble movement of wobble plate 12, provided on rotational main shaft 5 to rotate relatively thereto and to move in the axial direction and engaged with inner ring 27 movably in the axial direction together with inner ring 27, (b) an outer ring 30 having a plurality of guide grooves 28 for guiding balls 25 at positions opposing respective guide grooves 26 of inner ring 27, supported on sleeve 24 wabblingly, connected with wobble plate 12 fixedly on its outer circumference and supporting swash plate 8 rotatably via a bearing 29 (radial bearing), and (c) a plurality of balls 25 held by guide grooves 26, 28 formed in inner ring 27 and outer ring 30 at a condition of opposing each other and performing power transmission by being compressed between guide grooves 26, 28. Thrust bearings 31, 32 are interposed between wobble plate 12 and swash plate 8 and between rotor 6 and front housing 3, respectively. Further, although inner ring 27 is supported in housing 9 movably in the axial direction, its rotation is prevented. As means for preventing the rotation, a general rotation regulating means such as a key or a spline may be used (not depicted). Furthermore, although the rear end of rotational main shaft 5 is supported by bearing 22 provided on the inner diameter portion of inner ring 27, because rotational main shaft 5 is supported also at the side of front housing 3 through the compression main mechanism portion rotatably via bearing 33 (radial bearing), it is radially supported on both sides (inboard supporting).

In rotation preventing mechanism 21 of wobble plate 12 constructed as described above, outer ring 30 is wabblingly supported by sleeve 24 through the spherical surface contact, and sleeve 24 is supported by rotational main shaft 5 rotatably and movably in the axial direction, and by this structure, it is possible to make play in the radial direction between rotational main shaft 5 and the whole of the wobble mechanism portion small, thereby improving the reliability and reducing vibration and noise.

Further, in the above-described embodiment, since rotational main shaft 5 is supported in the condition of inboard supporting on both sides of the compression main mechanism portion by bearing 22 provided in the inner diameter portion of inner ring 27 and bearing 33 provided on front housing 3 side, a sufficiently high rigidity can be ensured even if the diameter of main shaft 5 is relatively small, the whirling of main shaft 5 can also be suppressed, making small-sized can be easily achieved, and improvement of reliability and reduction of vibration and noise may be possible. Further, as the result of suppressing the whirling of rotational main shaft 5, the whole of the rotational portion rotated together with rotational main shaft 5 can be suppressed to be small, and therefore, the rotational balance of the whole of the rotated portion becomes remarkably good. Where, in the above-described structure, it is possible to extend rotational main shaft 5 rearward and to replace it for a structure being supported directly by housing 2 via a bearing.

Moreover, in the above-described embodiment, by the engagement of the spherical surface (concave spherical surface) formed in the inner diameter side of inner ring 27 with the spherical surface (convex spherical surface) formed in the outer diameter side of sleeve 24, a mutual supporting between both members is performed. By adjusting a clearance in this supporting portion, it is possible to absorb a relative whirling of the inner and outer rings caused by the dispersion of the positions of the guide grooves for a plurality of balls operating for power transmission, whereby the uniform and continuous contact of balls 25 is further improved, and it is more advantageous with respect to reliability, vibration and noise.

Figure 4:
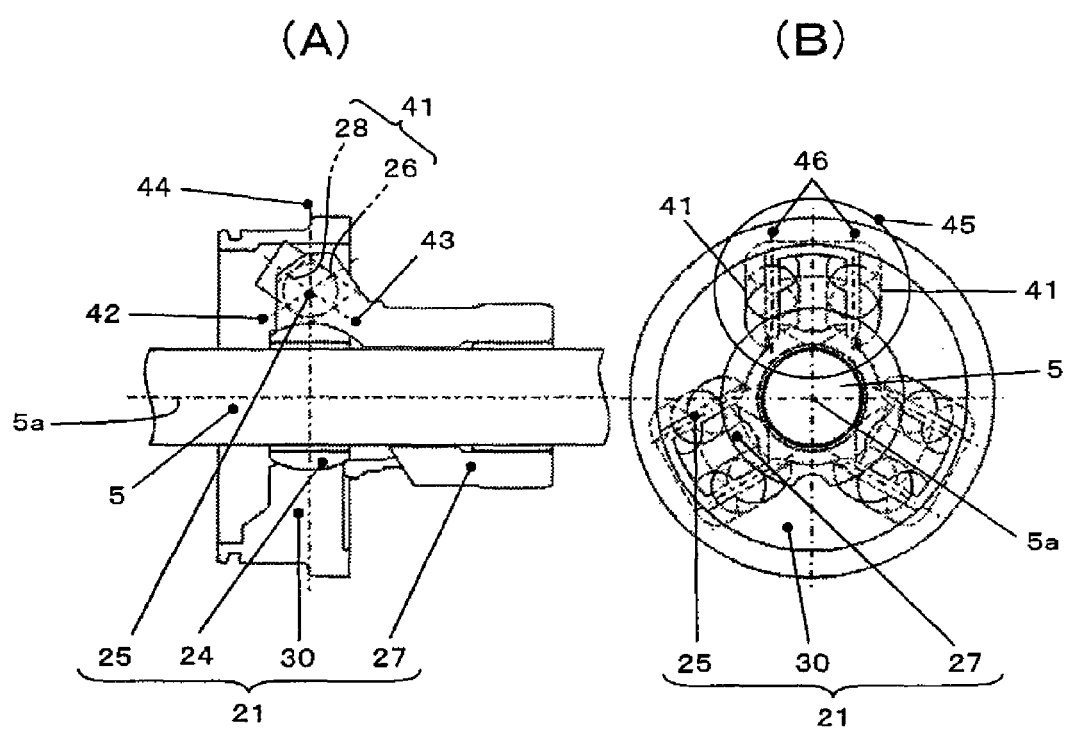
FIG. 4 shows an example of the structure of the wobble plate type variable displacement compressor depicted in FIG. 1, FIG. 4 (A) is a partial, vertical sectional view thereof, and FIG. 4 (B) is a partial elevational view thereof.

FIG. 4 shows a condition where the relative angle between the inner and outer rings is zero in rotation preventing mechanism 21 of wobble plate 12. As depicted in FIG. 4(A), guide grooves 26, 28 formed on inner ring 27 and outer ring 24 of rotation preventing mechanism 21 are disposed at relative angles (relative angles within a range of 30 to 60 degrees) relative to the center axis of rotational main shaft 5. Guide groove 26 formed on inner ring 27 (the axis of guide groove 26 is indicated by symbol 42) and guide groove 28 formed on outer ring 30 (the axis of guide groove 28 is indicated by symbol 43), which form one ball guide 41 and oppose each other, are disposed so as to be symmetric relative to plane 44 which is perpendicular to rotational main shaft 5 and passes through the wobble center of wobble plate 12, at a condition where the relative angle between the axis of inner ring 27 and the axis of outer ring 30 is zero. Ball 25 is regulated and supported on the intersection of axis 42 of guide groove 26 and axis 43 of guide groove 28. Further, as depicted in FIG. 4(B), a structure can be employed wherein two ball guides adjacent to each other among a plurality of ball guides 41 of rotation preventing mechanism 21 are referred to be a pair of ball guides, and respective ball guides 41 in the pair of ball guides 45, in other words, axes 46 of the guide grooves formed on the inner and outer rings in this portion, are disposed in parallel to each other. In such a structure, as aforementioned, because the play in the rotational direction in the rotation preventing mechanism portion is schematically decided by a relationship between the distance between the bottoms of the pair of guide grooves provided on the inner and outer rings and the diameter of the balls, setting and management of an actual clearance are facilitated, and it becomes possible to suppress the play to be small by setting a proper clearance. A plurality of balls 25 operating for power transmission are supported in the compression direction between guide grooves 26, 28 facing each other through the respective balls, and perform power transmission. Since ball 25 is held by guide grooves 26, 28 facing each other so as to be embraced and come into contact with both guide grooves 26, 28, the contact area between ball and the respective guide grooves 26, 28 may be ensured to be sufficient large, it becomes possible to reduce the contact surface pressure, and a structure remarkably advantageous in reliability, vibration and silent performance may be realized. Further, it is also possible to make the diameter of balls 25 small, and the whole of the rotation preventing mechanism may be made small.

Figure 5:
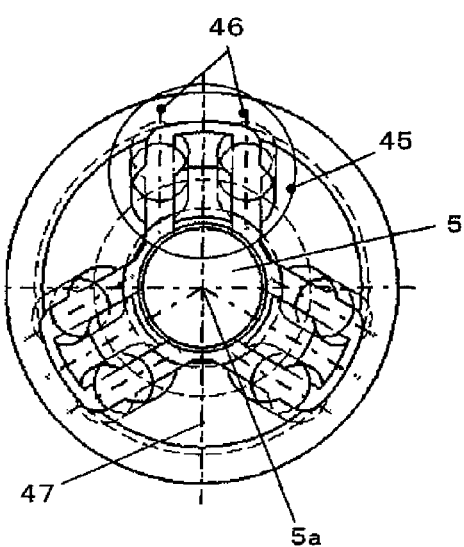
FIG. 5 is a partial elevational view showing another example of the structure of the wobble plate type variable displacement compressor depicted in FIG. 1.

Further, the load applied to ball, which is provided as a moment whose center is rotational main shaft 5, is generated as a perpendicular reaction force of the actual contact surface. The smaller the inclination of the normal line of the contact surface relative to the direction of the moment is, the smaller the contact load becomes, and as depicted in FIG. 5, by a structure where the pair of ball guides 45 disposed in parallel as described above are disposed symmetrically relative to plane 47 including center axis 5a of rotational main shaft 5, in other words, by a structure where axes 46 of two sets of guide grooves formed on the inner and outer rings are disposed symmetrically relative to plane 47 including center axis 5a of rotational main shaft 5, the mechanism is made as a rotation preventing mechanism which does not select the rotational direction, and it is possible to minimize the ball contact load.

Figure 6:
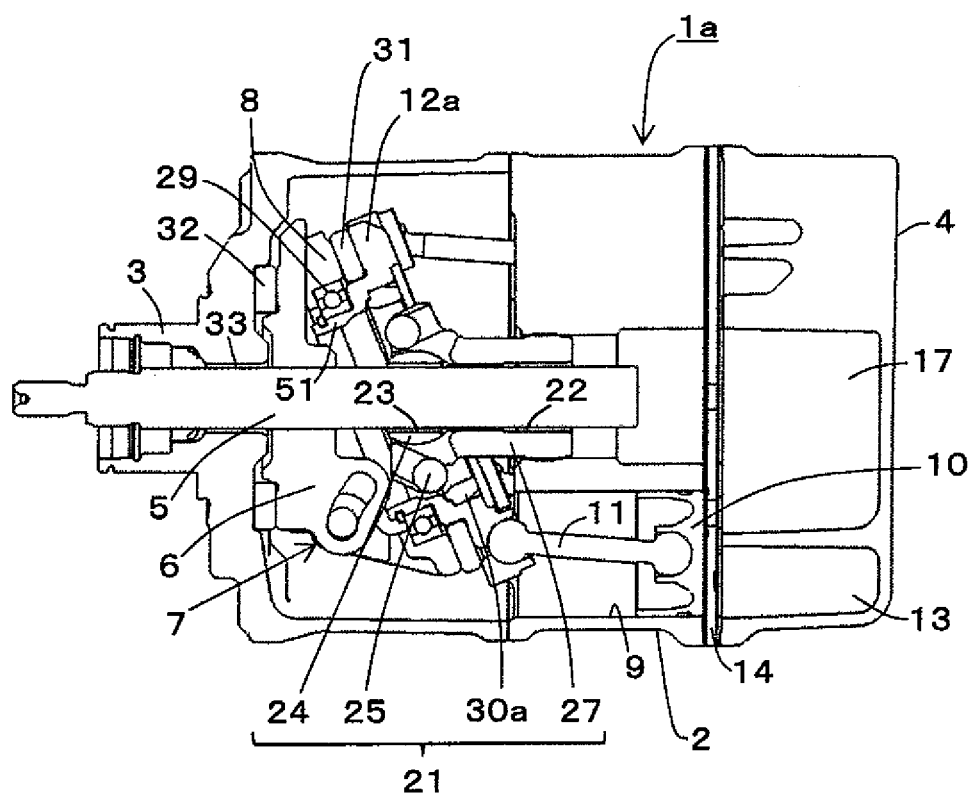
FIG. 6 is a vertical sectional view of a wobble plate type variable displacement compressor in which a relative rotation structure between a wobble plate and an outer ring, and a swash plate, is improved, as compared with the structure in the wobble plate type variable displacement compressor depicted in FIG. 1.
Figure 7:
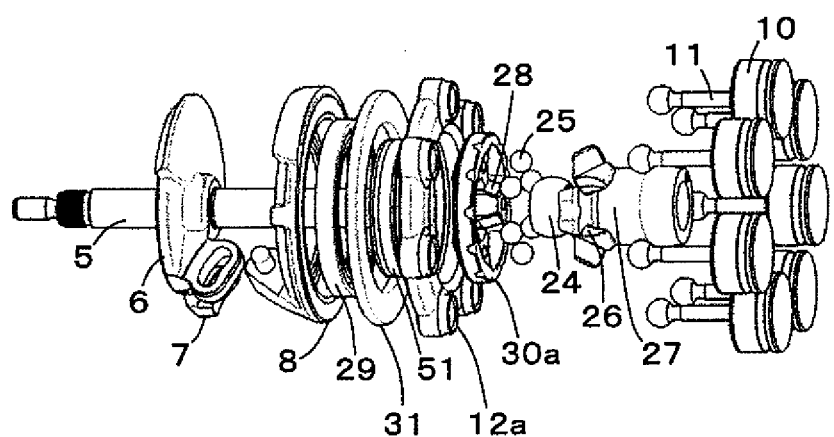
FIG. 7 is an exploded perspective view of a main portion including the wobble plate rotation preventing mechanism of the wobble plate type variable displacement compressor depicted in FIG. 6.
Figure 8:
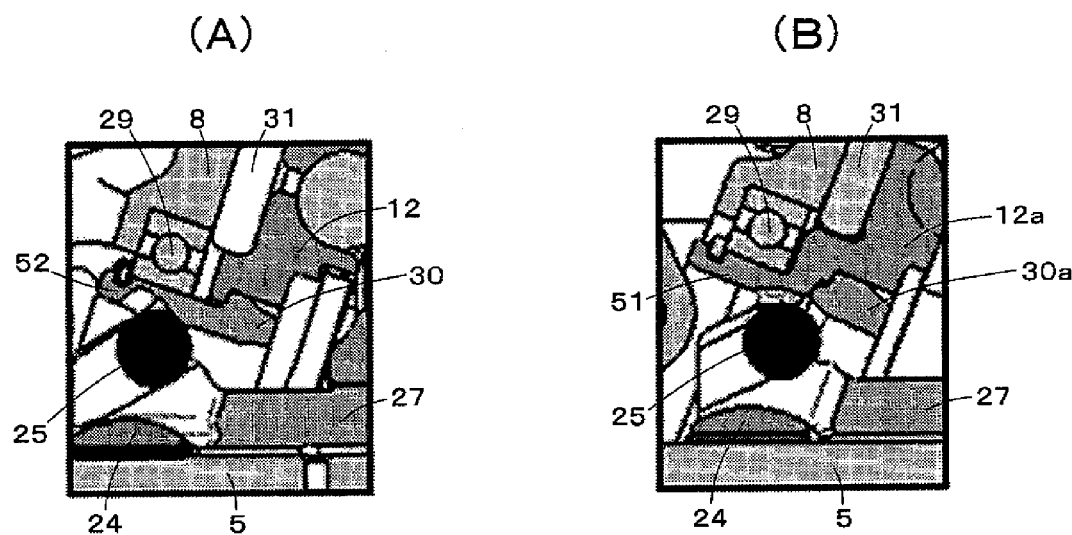
FIG. 8 (A) is a partial vertical sectional view showing the relative rotation structure between a wobble plate and an outer ring, and a swash plate, in the compressor depicted in FIG. 1, and FIG. 8 (B) is a partial vertical sectional view showing the relative rotation structure between the wobble plate and the outer ring, and the swash plate, in the compressor depicted in FIG. 6.

In the present invention, as compared with the above-described example of the basic structure, a relative rotation structure between swash plate 8, and wobble plate 12 and outer ring 30, is improved, for example, as shown in FIGS. 6 to 8. Where, in a wobble plate type variable displacement compressor 1a having an improved structure shown in FIGS. 6 to 8, because the portions other than an outer ring 30a and a wobble plate 12a are basically same as the structure shown in FIGS. 1 to 3, the explanation for the same portions will be omitted by providing the same symbols to the same portions as the symbols provided in FIGS. 1 to 3.

As shown in FIGS. 6 and 7, a cylindrical part 51 extending in swash plate 8 in the axial direction of swash plate 8 is provided to wobble plate 12a connected to outer ring 30a, and swash plate 8 is supported to be able to relatively rotate only in relation to wobble plate 12a via a bearing 29 (radial bearing) interposed between the outer circumferential surface of this cylindrical part 51 and the inner diameter portion of swash plate 8 and a bearing 31 (thrust bearing) interposed between the side surface of wobble plate 12a and the side surface of swash plate 8. Namely, a relative rotation structure is formed between swash plate 8, and wobble plate 12a and outer ring 30a, without supporting swash plate 8 relative to outer ring 30a so as to be able to relatively rotate. In order to show this portion more clearly, FIG. 8 shows a comparison between the structure (FIG. 8 (A)) wherein swash plate 8 is supported to be able to relatively rotate, on the outer circumferential surface of the outer circumferential annular portion of outer ring 30 shown in FIGS. 1 to 3 via bearing 29, and the structure (FIG. 8 (B)) wherein swash plate 8 is supported to be able to relatively rotate, on the outer circumferential surface of extended cylindrical part 51 of wobble plate 12a via bearing 29 by the improvement according to the present invention.

In the present invention, cylindrical part 51 extending in the axial direction of swash plate 8 is provided to wobble plate 12a, and swash plate 8 is supported to be able to relatively rotate in relation to cylindrical part 51 of wobble plate 12a via bearing 29, without being supported to be able to rotate relative to outer ring 30a. With respect to the structure wherein swash plate 8 is supported to be able to relatively rotate in relation to wobble plate 12a via bearing 31 (thrust bearing), there is no substantial difference between FIGS. 8 (A) and (B). By this structure wherein swash plate 8 is supported in relation to cylindrical part 51 via bearing 29, it becomes unnecessary that outer ring 30a extends up to the inner diameter portion of the swash plate, the axial length of annular portion 52 in the structure shown in FIG. 8 (A) can be greatly shortened, and the problems of deterioration in workability and productivity and the problem of increase in cost having been caused by making this annular portion 52 thin can be solved. Further, by making annular portion 52 unnecessary or greatly shortening it, outer ring 30a is formed small-sized, and therefore, the weight of outer ring 30a made from an iron-based material can be greatly reduced. Since wobble plate 12a can be formed from an aluminum-based material, even if cylindrical part 51 is provided, as compared with a case where annular portion 52 of an iron-based material exists, a great advantage for reducing the weight can be obtained. Therefore, in this section, improvement of workability and productivity and reduction of cost and weight can be all achieved.

Figure 9:
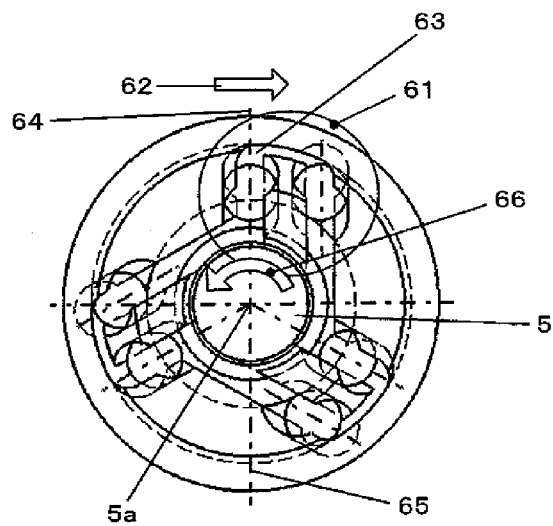
FIG. 9 is a partial elevational view showing a further example of the structure of the wobble plate type variable displacement compressor depicted in FIG. 1.

In the present invention, as an embodiment other than the embodiment depicted in FIGS. 1-5, for example, as depicted in FIG. 9, by offsetting one ball guide 63 mainly operating in power transmission direction of outer ring 62 among the pair of ball guides 61, in other words, axis 64 of the guide groove in the ball guide 63, onto plane 65 including center axis 5a of rotational main shaft 5, it is possible to further reduce the contact load in the specified restricted power transmission direction. Where, in FIG. 9, arrow 66 indicates power transmission direction of inner ring.

Figure 10:
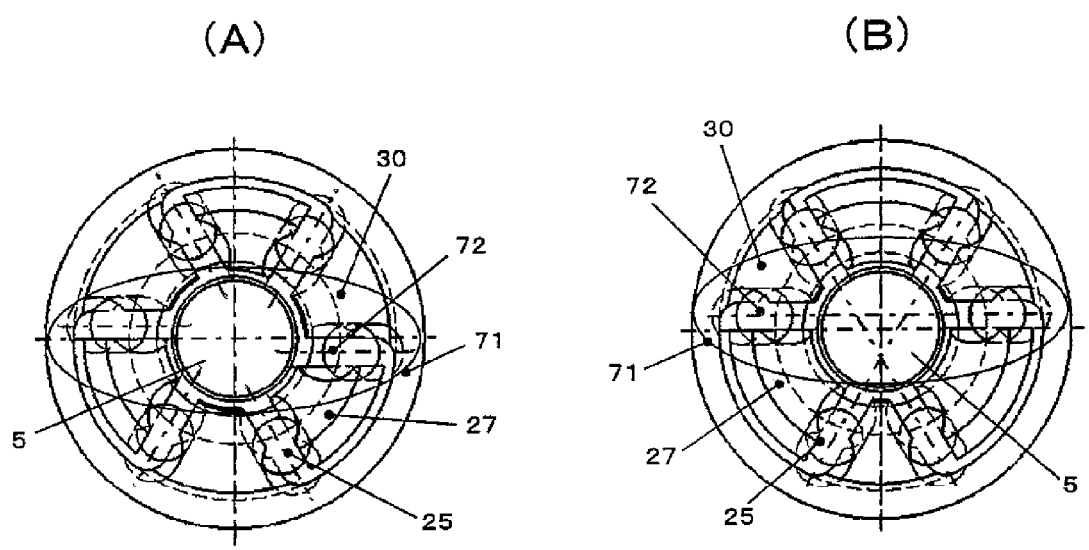
FIG. 10 shows partial elevational views showing further examples of the structure of the wobble plate type variable displacement compressor depicted in FIG. 1, and FIG. 10 (A) and FIG. 10 (B) show examples different from each other.

Further, as shown in FIG. 10 (A) or (B), a structure can also be employed wherein two ball guides disposed on both sides of rotational main shaft 5 approximately symmetrically relative to rotational main shaft 5 among a plurality of ball guides are referred to be a pair of ball guides, and the pair of ball guides 71 are disposed in parallel to each other, in other words, axes 72 of guide grooves formed on inner ring 27 and outer ring 30 forming the pair of ball guides 71 are disposed in parallel to each other. By this structure, because the play in the rotational direction in the rotation preventing mechanism portion is schematically decided by a relationship between the distance between a set of bottoms of the pair of guide grooves provided on inner and outer rings 27, 30 and the diameter of the balls, it becomes possible to set and manage the clearances in both ball guides simultaneously at desirable clearances, by disposing two ball guides, symmetrically disposed, in parallel to each other. Consequently, the setting and management of the clearances are facilitated, and it becomes possible to suppress the play to be small.

Figure 11:
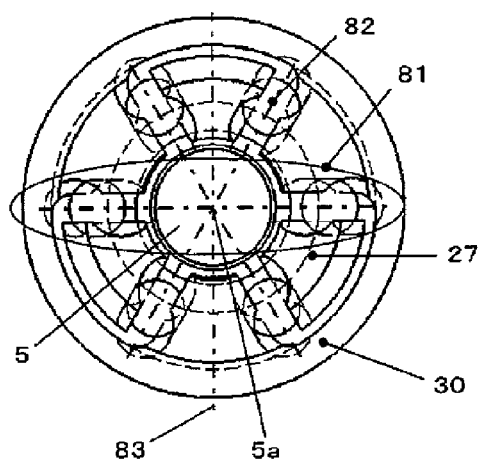
FIG. 11 is a partial elevational view showing a still further example of the structure of the wobble plate type variable displacement compressor depicted in FIG. 1.

Further, in this structure where the pair of ball guides are disposed in parallel to each other, as shown in FIG. 11, a structure can be employed wherein the pair of ball guides 81, which are disposed in parallel to each other, are disposed so that axes 82 of guide grooves forming the pair of ball guides are positioned on plane 83 including center axis 5a of rotational main shaft 5. In such a structure, the ball contact load is minimized without selecting the power transmission direction.

INDUSTRIAL APPLICATIONS OF THE INVENTION

The wobble plate type variable displacement compressor according to the present invention can be applied to a wobble plate type variable displacement compressor used in any field, and especially, it is suitable for use in the field for vehicles highly requiring making small-sized, increase of reliability, improvement of durability and silent performance, and cost down, in particular, for use in an air conditioning system for vehicles.

EXPLANATION OF SYMBOLS 1, 1a: wobble plate type variable displacement compressor
2: housing
3: front housing
4: rear housing
5: rotational main shaft
5a: center axis
6: rotor
7: hinge mechanism
8: swash plate
9: cylinder bore
10: piston
11: connecting rod
12, 12a: wobble plate
13: suction chamber
14: valve plate
15: suction hole
16: discharge hole
17: discharge chamber
21: rotation preventing mechanism of wobble plate
22, 23, 29, 33: bearing (radial bearing)

24: sleeve
25: ball
26: guide groove of inner ring
27: inner ring
28: guide groove of outer ring
30, 30a: outer ring
31, 32: thrust bearing
41: ball guide
42, 43: axis of guide groove
44: plane passing through wobble center
45: pair of ball guides
46: axes of guide grooves formed on inner and outer rings
47: plane including center axis of rotational main shaft
51: cylindrical part of wobble plate
52: annular portion
61: pair of ball guides
62: power transmission direction of outer ring
63: one ball guide
64: axis of guide groove
65: plane including center axis of rotational main shaft
66: power transmission direction of inner ring
71: pair of ball guides
72: axis of guide groove
81: pair of ball guides
82: axis of guide groove
83: plane including center axis of rotational main shaft

The invention claimed is:

1. A wobble plate type variable displacement compressor having pistons inserted reciprocally into cylinder bores, a swash plate rotated together with a rotational main shaft and supported changeably in angle relative to said main shaft, a wobble plate which is connected to said pistons, in which a rotational movement of said swash plate is converted into a wobble movement of said wobble plate, and which transmits said wobble movement to said pistons to reciprocate said pistons, and a rotation preventing mechanism of said wobble plate, characterized in that
said rotation preventing mechanism of said wobble plate comprises
(a) an inner ring provided in a housing movably in an axial direction while being prevented from rotation relative to the housing, the inner ring having a plurality of guide grooves for guiding a plurality of balls provided for force transmission, the inner ring being configured to move in the axial direction on the main shaft,
(b) an outer ring having a plurality of guide grooves for guiding said balls at positions opposing respective guide grooves of said inner ring, and connected to said wobble plate on an outer circumference of said outer ring and supported wobblingly together with said wobble plate,
(c) the plurality of balls being held by said guide grooves formed in said inner ring and said outer ring and performing force transmission by being held between said guide grooves which oppose each other, and
(d) a sleeve functioning as a wobble central member of said wobble movement of said wobble plate, provided on said rotational main shaft to rotate relatively thereto and to move in an axial direction and engaged with said inner ring movably in an axial direction together with said inner ring, and said outer ring is supported wobblingly on said sleeve,
said wobble plate is provided with a cylindrical part which extends in the axial direction and is connected to said outer ring, said swash plate is supported to be able to rotate relative to said wobble plate via a bearing interposed at least between said cylindrical part and an inner diameter portion of said swash plate, and
said main shaft is rotatably supported within the housing, the housing having the cylinder bores at a rear end and an inboard support for the main shaft at a front end,
wherein said guide grooves opposing each other of said inner ring and said outer ring of said wobble plate rotation preventing mechanism are formed at a relative angle of 30 to 60 degrees relative to a center axis of said rotational main shaft, and guide grooves opposing each other for forming a single ball guide are disposed so as to be symmetric relative to a plane perpendicular to said main shaft and passing through a wobble center of said wobble plate at a condition where a relative angle between an axis of said inner ring and an axis of said outer ring is zero.

2. The wobble plate type variable displacement compressor according to claim 1, wherein two ball guides adjacent to each other among a plurality of ball guides of said wobble plate rotation preventing mechanism are a pair of ball guides disposed in parallel to each other.

3. The wobble plate type variable displacement compressor according to claim 2, wherein said pair of ball guides disposed in parallel to each other are disposed symmetrically relative to a plane including a center axis of said rotational main shaft.

4. The wobble plate type variable displacement compressor according to claim 2, wherein a guide groove forming one ball guide of said pair of ball guides, which are disposed in parallel to each other, is disposed so that its axis is positioned on a plane including a center axis of said rotational main shaft.

5. The wobble plate type variable displacement compressor according to claim 1, wherein two ball guides disposed on both sides of said rotational main shaft approximately symmetrically relative to said rotational main shaft among a plurality of ball guides of said wobble plate rotation preventing mechanism are a pair of ball guides disposed in parallel to each other.

6. The wobble plate type variable displacement compressor according to claim 5, wherein said pair of ball guides, which are disposed in parallel to each other, are disposed so that axes of guide grooves forming said pair of ball guides are positioned on a plane including a center axis of said rotational main shaft.

7. The wobble plate type variable displacement compressor according to claim 1, wherein an inner diameter side of the inner ring has a spherical surface and an outer diameter side of the sleeve has a spherical surface, and the inner ring and the sleeve are mutually supported by engaging the spherical surface of the inner diameter side of the inner ring with the spherical surface of the outer diameter side of the sleeve so that there is a clearance between the spherical surfaces.

* * * * *